(12) United States Patent
Noritake et al.

(10) Patent No.: US 9,249,944 B2
(45) Date of Patent: Feb. 2, 2016

(54) VEHICLE REAR LAMP STRUCTURE

(71) Applicant: TOYOTA JIDOSHA KABUSHIKI KAISHA, Toyota-shi (JP)

(72) Inventors: Yuji Noritake, Toyota (JP); Ken Nishioka, Okazaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/388,290

(22) PCT Filed: Dec. 19, 2013

(86) PCT No.: PCT/JP2013/084118
§ 371 (c)(1),
(2) Date: Sep. 26, 2014

(87) PCT Pub. No.: WO2014/112289
PCT Pub. Date: Jul. 24, 2014

(65) Prior Publication Data
US 2015/0055362 A1 Feb. 26, 2015

(30) Foreign Application Priority Data
Jan. 17, 2013 (JP) ................................. 2013-006470

(51) Int. Cl.
*F21S 8/10* (2006.01)
*B60Q 1/22* (2006.01)

(52) U.S. Cl.
CPC ................. *F21S 48/232* (2013.01); *B60Q 1/22* (2013.01); *F21S 48/2212* (2013.01); *F21S 48/24* (2013.01); *F21S 48/25* (2013.01)

(58) Field of Classification Search
CPC ...... B60Q 1/22; F21S 48/2212; F21S 48/232; F21S 48/24; F21S 48/25

USPC .................................................. 362/540–545
See application file for complete search history.

(56) References Cited

U.S. PATENT DOCUMENTS

| 1,699,800 | A |   | 1/1929 | Clarence |
| 6,113,254 | A | * | 9/2000 | Kaneko ......................... 362/520 |

FOREIGN PATENT DOCUMENTS

| DE | 102005042574 A1 | 3/2007 |
| JP | S61-091805 U | 6/1986 |
| JP | H06-080055 A | 3/1994 |
| JP | 2000-215711 A | 8/2000 |
| JP | 2007-053046 A | 3/2007 |
| JP | 2008-037381 A | 2/2008 |

OTHER PUBLICATIONS

Extended European Search Report dated Dec. 1, 2015 in EP Application No. 13871760.8.

* cited by examiner

*Primary Examiner* — Stephen F Husar
(74) *Attorney, Agent, or Firm* — Kenyon & Kenyon LLP

(57) ABSTRACT

It is provided a vehicle rear lamp structure that can effectively utilize light that is illuminated from a light source. A door side lamp portion of a rear combination lamp has a housing that supports an incandescent bulb for a back lamp, and a lens that covers the incandescent bulb for the back lamp by being fixed to the housing, and transmits light illuminated from the incandescent bulb for the back lamp. Further, a garnish is mounted to the door side lamp portion. A surface at the lens side of the garnish reflects light, that is illuminated from the incandescent bulb for the back lamp, toward a vehicle rear side. Due thereto, light illuminated from the incandescent bulb for the back lamp can be utilized effectively.

3 Claims, 2 Drawing Sheets

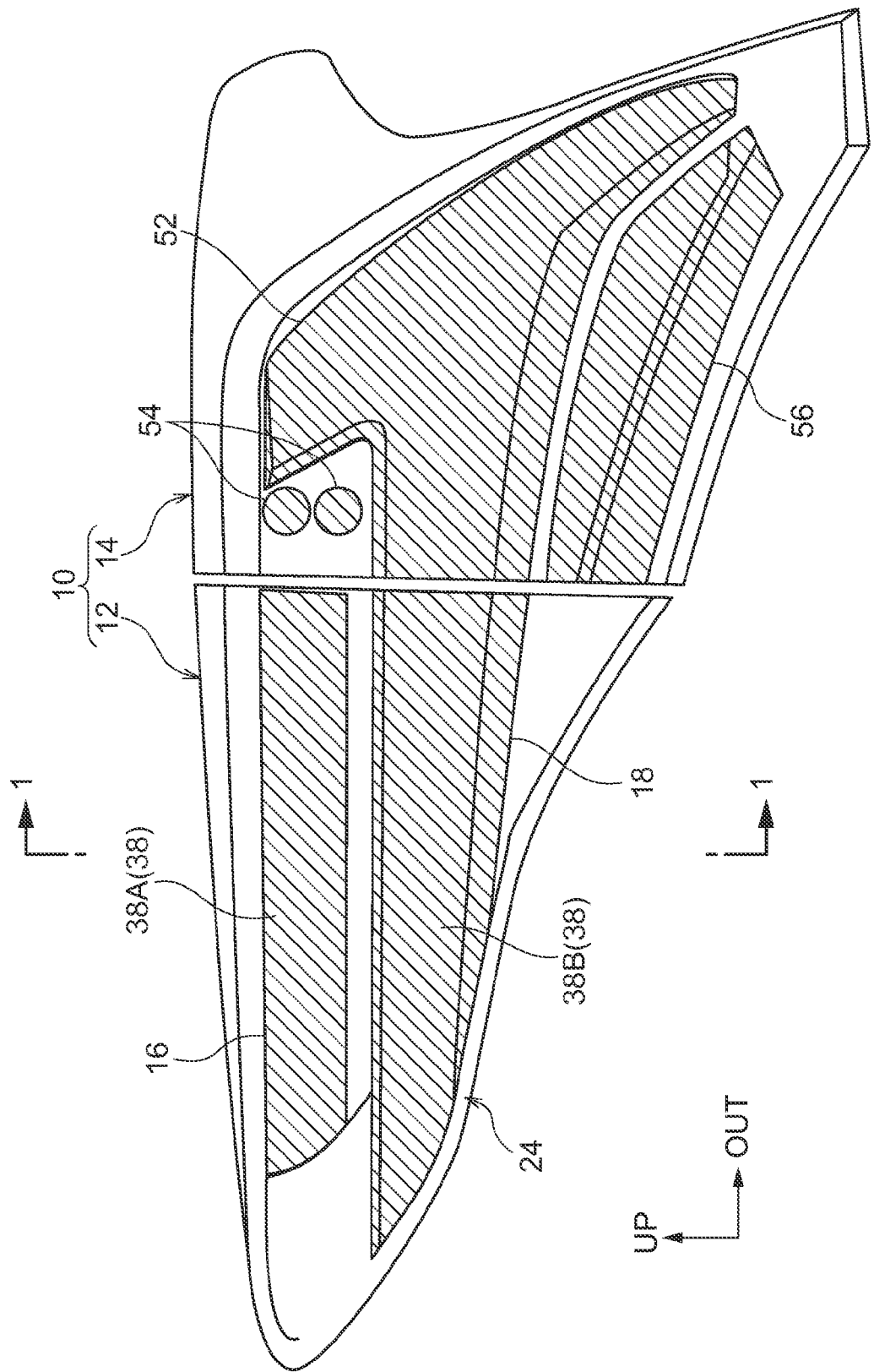

VEHICLE REAR LAMP STRUCTURE

CROSS-REFERENCE TO RELATED APPLICATIONS

This is a national phase application based on the PCT International Patent Application No. PCT/JP2013/084118 filed Dec. 19, 2013, claiming priority to Japanese Patent Application No. 2013-006470 filed Jan. 17, 2013, the entire contents of both of which are incorporated herein by reference.

TECHNICAL FIELD

The present invention relates to a vehicle rear lamp structure.

RELATED ART

There have conventionally been disclosed integral vehicle lamps (vehicle combination lamps) that are provided with a cornering lamp and a side turn lamp (see, for example, Japanese Patent Application Laid-Open (JP-A) No. 2007-53046). This vehicle lamp is structured by an outer lens being mounted to a housing that supports a lamp bulb and a reflector. Further, a sealing material is interposed at the joined portion (sealed portion) of the housing and the outer lens.

SUMMARY OF INVENTION

Technical Problem

However, in a case in which a garnish that covers the joined portion (sealed portion) of the housing and the outer lens is provided in order to suppress deterioration in the quality of the external appearance of the vehicle, light from the lamp bulb is not illuminated from the portion where this garnish is provided (the light of the lamp bulb is blocked by the garnish). Namely, the light illuminated from the lamp bulb toward the garnish cannot be utilized effectively. In particular, in a vehicle rear lamp that lets others know that the vehicle is decelerating or the vehicle is moving rearward or the like by illuminating light toward the rear side of the vehicle, it is desirable to be able to effectively utilize the light that is illuminated from the light source, such as the lamp bulb or the like, toward the garnish.

In view of the above-described circumstances, an object of the present invention is to provide a vehicle rear lamp structure that can effectively utilize light that is illuminated from a light source.

Solution to Problem

A vehicle rear lamp structure relating to a first aspect comprises: a housing to which a light source is mounted; a lens that is open toward a housing side, and that covers the light source by being fixed to the housing, and the lens transmitting light illuminated from the light source; and a garnish that covers a predetermined position of the lens, and whose surface at a lens side reflects light, that is illuminated from the light source, toward a vehicle rear side.

In accordance with the above-described aspect, when light is illuminated from the light source that is supported at the housing, this light is transmitted through the lens. Namely, the lamp is lit. Further, in the present invention, a predetermined position of the lens is covered by the garnish. Moreover, in the present invention, the surface at the lens side of the garnish reflects light, that is illuminated from the light source, toward the vehicle rear side. In other words, the light, that has proceeded from the light source toward the garnish, proceeds toward the vehicle rear side without being blocked by the garnish.

In a vehicle rear lamp structure relating to a second aspect, in the above-described first aspect, a convex portion, that projects toward the vehicle rear side, is provided at the lens, and the surface at the lens side of the garnish reflects light, that is illuminated from the light source, toward a distal end side of the convex portion.

In accordance with the above-described aspect, the convex portion, that projects toward the vehicle rear side, is provided at the lens. Therefore, light, that is transmitted from the proximal end side of the convex portion, is blocked by the convex portion and cannot proceed past this convex portion. However, in the present invention, the surface at the lens side of the garnish reflects light, that is illuminated from the light source, toward the distal end side of the convex portion, and therefore, light of the light source can be made to proceed past the convex portion.

In a vehicle rear lamp structure relating to a third aspect, in the above-described second aspect, the convex portion is provided at a lower end portion of the lens, and the garnish is mounted to a region at a vehicle upper side of the lens, and a surface at a vehicle lower side of the garnish reflects light, that is illuminated from the light source, toward a vehicle obliquely lower side.

In accordance with the above-described aspect, the convex portion, that projects toward the vehicle rear side, is provided at the lower end portion of the lens. Therefore, light, that is transmitted from the proximal end side of the convex portion, is blocked by the convex portion and cannot proceed toward a vehicle obliquely lower side. However, in the present invention, the surface at the lens side of the garnish reflects light, that is illuminated from the light source, toward a vehicle obliquely lower side, and therefore, light of the light source can be made to proceed past the convex portion toward a vehicle obliquely lower side. Due thereto, the road surface at the vehicle rear side can be illuminated.

In a vehicle rear lamp structure relating to a fourth aspect, in any of the above-described first through third aspects, the light source is lit at times when a vehicle moves rearward.

In accordance with the above-described aspect, the visibility at the time when the vehicle moves rearward can be improved.

In a vehicle rear lamp structure relating to a fifth aspect, in the above-described second or third aspect, a light source of a tail lamp is provided between the housing and the lens, and the light source of the tail lamp is disposed at a vehicle front side of the convex portion.

In accordance with the above-described aspect, by illuminating the convex portion, the visibility from the vehicle rear side can be improved.

Advantageous Effects of Invention

The vehicle rear lamp structures relating to the first aspect, the fourth aspect and the fifth aspect have the excellent effect that light that is illuminated from a light source can be utilized effectively.

The vehicle rear lamp structure relating to the second aspect has the excellent effect that, even in a case in which a convex portion is formed at a lens, light of a light source can be made to proceed in the intended direction at the rear of the vehicle.

The vehicle rear lamp structure relating to the third aspect has the excellent effect that the visibility of the vehicle rear side can be improved.

BRIEF DESCRIPTION OF THE DRAWINGS

FIG. 2 is an elevation in which a rear combination lamp is seen from the rear side of a vehicle.

DESCRIPTION OF EMBODIMENTS

Figure 1:
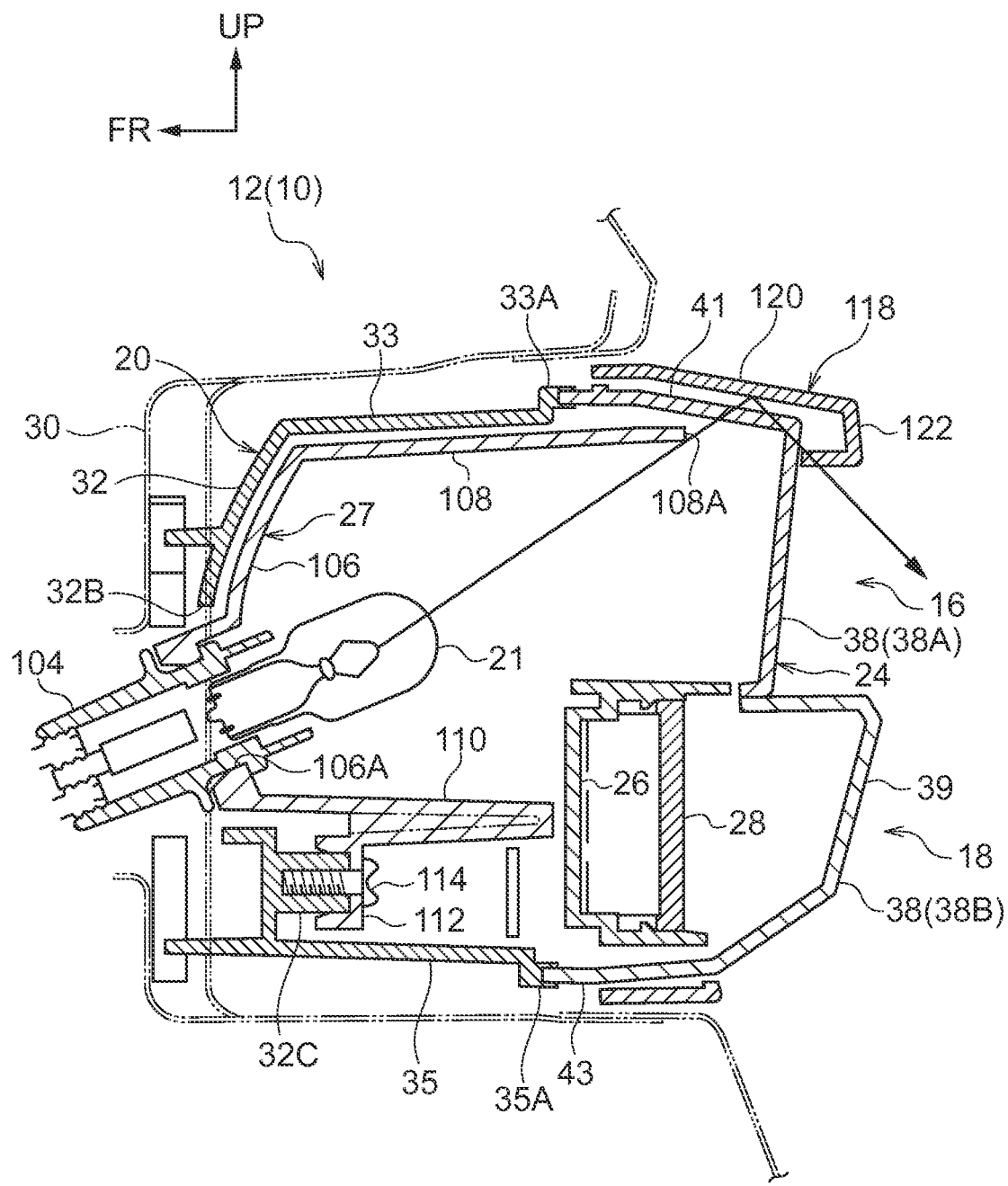
FIG. 1 is an enlarged sectional view showing, in an enlarged manner, a back lamp that is cut along line 1-1 shown in FIG. 2.

A vehicle rear lamp structure relating to an embodiment of the present invention is described next by using FIG. 1 and FIG. 2. Note that the vehicle longitudinal direction front side is indicated by arrow FR, the vehicle transverse direction outer side is indicated by arrow OUT, and the vehicle vertical direction upper side is indicated by arrow UP. Further, in the following description, when stating merely longitudinal and vertical directions, they mean the longitudinal of the vehicle longitudinal direction and the vertical of the vehicle vertical direction.

As shown in FIG. 2, the vehicle rear lamp structure of the present embodiment is applied to a rear combination lamp 10 that serves as a vehicle rear lamp and is provided at the rear portion of a vehicle. This rear combination lamp 10 is structured to have a door side lamp portion 12 that is mounted to an unillustrated back door that closes a back door opening portion, and a fender side lamp portion 14 that is mounted to the rear end portion of an unillustrated rear fender. Further, the door side lamp portion 12 and the fender side lamp portion 14 are disposed so as to be adjacent to one another in the state in which back door is closed.

The door side lamp portion 12 is structured to have a back lamp 16 that, by illuminating substantially white light toward the vehicle rear side, lets others know that the vehicle is moving rearward, and a tail lamp 18 that, by illuminating red light toward the vehicle rear side, lets others know of the existence of the vehicle.

Further, the fender side lamp portion 14 is structured to have a tail-and-stop lamp 52 that, by being lit at substantially the same illuminance as the tail lamp 18 of the door side lamp portion 12, lets others know of the existence of the vehicle, and that, by being lit at a higher illuminance at the time when the vehicle decelerates, lets others know that the vehicle is decelerating, and two stop lamps 54 that, by being lit independently of this tail-and-stop lamp 52, let others know that the vehicle is decelerating, and a turn signal lamp 56 that, by flashing at a predetermined cycle, lets others know that the vehicle is changing its path or the like.

The detailed structure of the door side lamp portion 12, that is a main portion of the present embodiment, is described next.

As shown in FIG. 1, the door side lamp portion 12 that has the back lamp 16 and the tail lamp 18 has a housing 20 that, by being fixed to the back door, supports the door side lamp portion 12 and supports the light sources of the back lamp 16 and the tail lamp 18 (a incandescent bulb 21 for the back lamp and an unillustrated LED for the tail lamp that serve as the light sources). Further, the door side lamp portion 12 has a lens 24 that, by being fixed to the housing 20, covers the incandescent bulb 21 for the back lamp and the LED for the tail lamp, and transmits the light illuminated from the incandescent bulb 21 for the back lamp and the LED for the tail lamp. Moreover, a reflector 26 for the tail lamp, that reflects the light illuminated from the LED for the tail lamp toward the lens 24 side, and a diffusing inner 28 for the tail lamp, that diffuses the light reflected by this reflector 26 for the tail lamp, are provided between the housing 20 and the lens 24. Further, a reflector 27 for the back lamp, that reflects the light illuminated from the incandescent bulb for the back lamp toward the lens 24 side, is provided between the housing 20 and the lens 24.

The housing 20 is formed in the shape of a box that is open toward the vehicle rear side, and further, the housing 20 has a base wall 32 that is fixed to a back door panel 30 that structures a portion of the back door. Further, an insert-through hole 32B, through which are inserted the incandescent bulb 21 for the back lamp and a connector 104 for supplying electricity to this incandescent bulb 21 for the back lamp, is formed in the intermediate portion in the vehicle vertical direction of this base wall 32. Moreover, a boss portion 32C, that is cylindrical tube shaped and projects-out toward the vehicle rear side, stands erect at the vehicle lower side end portion of this base wall 32.

Further, the housing 20 has an upper wall 33 that extends from the vehicle upper side end portion of the base wall 32 toward the vehicle rear side. The end portion at the vehicle rear side of this upper wall 33 is made to be a fixing portion 33A to which the lens 24 is fixed. Moreover, the housing 20 has a lower wall 35 that extends from the vehicle lower side end portion of the base wall 32 toward the vehicle rear side. The end portion at the vehicle rear side of this lower wall 35 is made to be a fixing portion 35A to which the lens 24 is fixed.

The lens 24 is formed in the shape of a box that is open toward the vehicle front side. Further, as shown in FIG. 2, the lens 24 has a base wall 38 that extends in the vehicle transverse direction and the vehicle vertical direction and that is formed in a rectangular shape that narrows toward the vehicle transverse direction inner side as seen from the vehicle rear side. The region at the vehicle upper side of this base wall 38 is made to be a back lamp light transmission portion 38A that is colorless and transparent. Further, the region at the lower side of the back lamp light transmission portion 38A is made to be a tail lamp light transmission portion 38B that is red and transparent. Moreover, as shown in FIG. 1, the tail lamp light transmission portion 38B projects-out toward the vehicle rear side. In other words, a convex portion 39, that projects-out toward the vehicle rear side, is formed at the lower end portion of the base wall 38 of the lens 24.

Further, the lens 24 has an upper wall 41, that extends from the vehicle upper side end portion of the base wall 38 toward the vehicle front side, and a lower wall 43, that extends from the vehicle lower side end portion of the base wall 38 toward the vehicle front side. The front ends of this upper wall 41 and lower wall 43 are respective fixed to the fixing portions 33A, 35A of the housing 20.

Further, the reflector 27 for the back lamp opens toward the vehicle front side and is formed in a substantial U-shape in cross-section as seen in a vehicle side sectional view. Concretely, the reflector 27 for the back lamp has a base wall 106 that extends so as to curve gently in the vehicle longitudinal direction and the vehicle transverse direction. An anchor hole 106A on which the connector 104 is anchored is formed in this base wall 106. Further, the reflector 27 for the back lamp has an upper wall 108 that extends from the vehicle upper side end portion of the base wall 106 toward the vehicle rear side. An end portion 108A at the vehicle rear side of this upper wall 108 is disposed further toward the vehicle front side than the base wall 38 of the lens 24. Namely, the end portion 108A at the vehicle rear side of the upper wall 108 and the base wall 38 of the lens 24 are disposed so as to be apart. Further, the reflector 27 for the back lamp has a lower wall 110 that extends from the vehicle lower side end portion of the base wall 106 toward the vehicle lower side. Further, a fixing portion 112, that projects-out toward the vehicle lower side, stands erect at the lower wall 110. Due to a screw 114, that is inserted-through this fixing portion 112, being screwed into the boss portion 32C of the housing 20, the reflector 27 for the back lamp is fixed to the housing 20. The surface at the vehicle rear side of the reflector 27 for the back lamp that is described above is made into a mirror surface by aluminum vapor deposition or the like.

Further, a garnish 118 is mounted to the upper portion of the door side lamp portion 12. This garnish 118 is formed in the shape of a plate that extends in the vehicle transverse direction. Further, the garnish 118 is structured to have a general portion 120, that extends along the upper wall 41 of the lens 24, and a bent portion 122 at which the region at the vehicle rear side of the general portion 120 is bent in a U-shape. Due to this garnish 118 being mounted to the door side lamp portion 12, the upper wall 41 of the lens 24 is covered by the garnish 118, and the fixing portion 33A of the housing 20 to the lens 24 being seen from the vehicle rear side is prevented.

Further, the surface at the lens 24 side (the surface at the vehicle lower side) of the general portion 120 of the garnish 118 is made into a mirror surface by aluminum vapor deposition or the like. Due thereto, the light, that is illuminated from the incandescent bulb 21 for the back lamp onto the general portion 120 of the garnish 118, can be reflected toward the vehicle rear side and the vehicle lower side (toward a vehicle obliquely lower side).

Further, in the present embodiment, the angle of the general portion 120 is set such that the general portion 120 of the garnish 118 reflects the light, that is illuminated from the incandescent bulb 21 for the back lamp, toward the distal end side of the convex portion 39 that is formed at the base wall 38 of the lens 24.

Operation and Effects of Present Embodiment

The operation and effects of the present embodiment are described next.

As shown in FIG. 1, in the present embodiment, when light is illuminated from the incandescent bulb 21 for the back lamp, this light, either directly or via the reflector 27 for the back lamp, is transmitted through the lens 24. Namely, the back lamp 16 is lit. Further, in the present embodiment, due to the upper wall 41 of the lens 24 being covered by the garnish 118, the fixing portion 33A of the housing 20 to the lens 24 is prevented from being seen from the vehicle rear side. Moreover, in the present embodiment, the surface, at the lens 24 side, of the general portion 120 of the garnish 118 reflects the light, that is illuminated from the incandescent bulb 21 for the back lamp, toward the vehicle rear side. In other words, the light, that has proceeded from the incandescent bulb 21 for the back lamp toward the general portion 120 of the garnish 118, proceeds toward the vehicle rear side without being blocked by the garnish 118. Namely, in the present embodiment, the light that is illuminated from the incandescent bulb 21 for the back lamp can be utilized effectively.

Further, in the present embodiment, the convex portion 39, that projects-out toward the vehicle rear side, is formed at the base wall 38 of the lens 24. Therefore, the light of the incandescent bulb 21 for the back lamp, that has been transmitted from a region at the vehicle upper side of the base wall 38 (the proximal end side of the convex portion 39), is blocked by the convex portion 39 and cannot proceed past this convex portion 39. However, in the present embodiment, the surface at the lens 24 side of the garnish 118 reflects the light, that is illuminated from the incandescent bulb 21 for the back lamp, toward the distal end side of the convex portion 39, and therefore, the light of the incandescent bulb 21 for the back lamp can be made to proceed past the convex portion 39. Namely, in the present embodiment, even in a case in which the convex portion 39 is formed at the lens 24, the light of the incandescent bulb 21 for the back lamp can be made to proceed in the intended direction at the rear of the vehicle. In particular, in the present embodiment, the light of the incandescent bulb 21 for the back lamp can be made to proceed toward the road surface at the vehicle rear side. Due thereto, the visibility of the vehicle rear side is improved.

Note that the present embodiment describes an example in which the garnish 118 is mounted to a region at the vehicle upper side of the lens 24, but the present invention is not limited to this. It suffices to set the position, to which the garnish is mounted, appropriately in consideration of the convex portion and the concave portion formed at the lens, or the direction of the light reflected by the garnish, or the like.

Further, although the present embodiment describes an example in which the present invention is applied to the rear combination lamp 10, the present invention can also be applied to other vehicle rear lamps.

Although an embodiment of the present invention has been described above, the present invention is not limited to the above, and can, of course, be implemented by being modified in various ways other than the above within a scope that does not depart from the gist thereof.

The invention claimed is:

1. A vehicle rear lamp structure comprising:
  a housing to which a first light source and a second light source disposed at a vehicle lower side of the first light source are mounted;
  a lens that is open toward a housing side, an open end portion of the lens covering the first light source and the second light source by being fixed to the housing, and the lens transmitting light illuminated from the first light source and the second light source; and
  a garnish that is mounted to a region at a vehicle upper side of the lens, a surface at a vehicle lower side of the garnish reflecting light that is illuminated from the first light source toward a vehicle obliquely lower side.

2. The vehicle rear lamp structure of claim 1, wherein
  a convex portion, that projects toward the vehicle rear side, is provided at a portion of the lens that faces the second light source in a vehicle longitudinal direction, and
  the surface at the lens side of the garnish reflects light, that is illuminated from the first light source, toward a distal end side of the convex portion.

3. The vehicle rear lamp structure of claim 1, wherein the first light source is a back lamp that lets others know that the vehicle is moving rearward, and the second light source is a tail lamp that lets others know of the existence of the vehicle.

* * * * *